United States Patent
Aardema et al.

[11] Patent Number: 5,880,957
[45] Date of Patent: Mar. 9, 1999

[54] METHOD FOR PROGRAMMING HYDRAULIC IMPLEMENT CONTROL SYSTEM

[75] Inventors: James A. Aardema, Joilet; David G. Blahnik, Metamora; Stephen J. Jackson, Peoria; Steven D. Monday, Glasford; Amy L. Moore-McKee, Varna; David W. Stevens, Morris, all of Ill.

[73] Assignee: Caterpillar Inc., Peoria, Ill.

[21] Appl. No.: 758,322

[22] Filed: Dec. 3, 1996

[51] Int. Cl.⁶ ..................................... G05B 19/42
[52] U.S. Cl. ...................... 364/191; 364/140.01
[58] Field of Search .................... 364/191, 192, 364/140, 551.01, 510, 188, 139, 140.01–140.1; 91/361, 459; 60/327, 368; 702/83

[56] References Cited

U.S. PATENT DOCUMENTS

| | | | |
|---|---|---|---|
| 4,823,551 | 4/1989 | Hehl | 60/368 |
| 5,052,883 | 10/1991 | Morita et al. | 414/700 |
| 5,172,311 | 12/1992 | Reinhart et al. | 364/140 |
| 5,301,128 | 4/1994 | Bybee | 364/551.01 |
| 5,345,550 | 9/1994 | Bloomfield | 395/156 |
| 5,371,895 | 12/1994 | Bristol | 364/191 |
| 5,394,697 | 3/1995 | Hirata | 60/426 |
| 5,481,716 | 1/1996 | Morshedi et al. | 364/188 |
| 5,648,898 | 7/1997 | Moore-McKee et al. | 364/191 |

FOREIGN PATENT DOCUMENTS

| | | | |
|---|---|---|---|
| 0531435B1 | 5/1991 | European Pat. Off. | G05B 19/42 |
| 0532195A2 | 8/1992 | European Pat. Off. | G05D 17/02 |

OTHER PUBLICATIONS

EPO—Patent Abstracts of Japan—Publication #07190009, dated Jul. 28, 1995 Controller in Hydraulic Construction Machine—Hitachi Constr Mach Co.

Proceedings of the Industrial Computing Conference, vol. 1; B0195610 Presented at: Anaheim Convention Center—Oct. 27–31, 1991, Maclay pp. 387–400.

State of the Art 19(1994) Oct. No. 10, Peterborough, NH, US Process Control's New Face, Mark Clarkson, Byte, pp. 111,112,114–116,118.

U.S. application No. 08/359,317, filed Dec. 19, 1994.
U.S. application No. 08/408,759, filed Mar. 21, 1995.
U.S. application No. 08/408,763, filed Mar. 21, 1995.
U.S. application No. 08/418,991, filed Mar. 21, 1995.

*Primary Examiner*—Paul P. Gordon
*Assistant Examiner*—Steven R. Garland
*Attorney, Agent, or Firm*—James R. Yee; Steven G. Kibby

[57] ABSTRACT

A method of operating a computer to produce control software for a hydraulic system is provided. The hydraulic system includes a pump, at least one valve, a motor and an electronic controller. The method includes the steps of defining a set of valve features of the electronic controller as a function of user input; and producing control software to operate the controller as specified by said set of valve features.

8 Claims, 11 Drawing Sheets

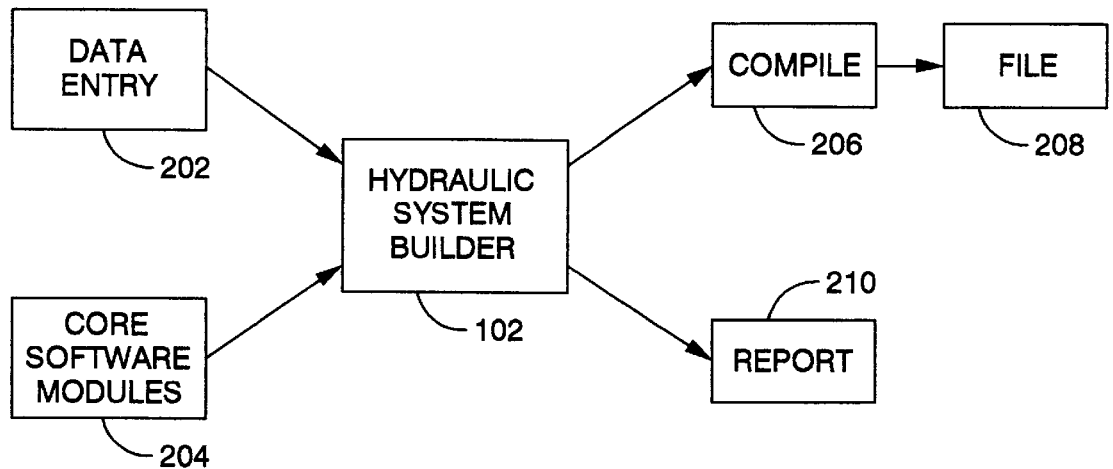
Fig_2_
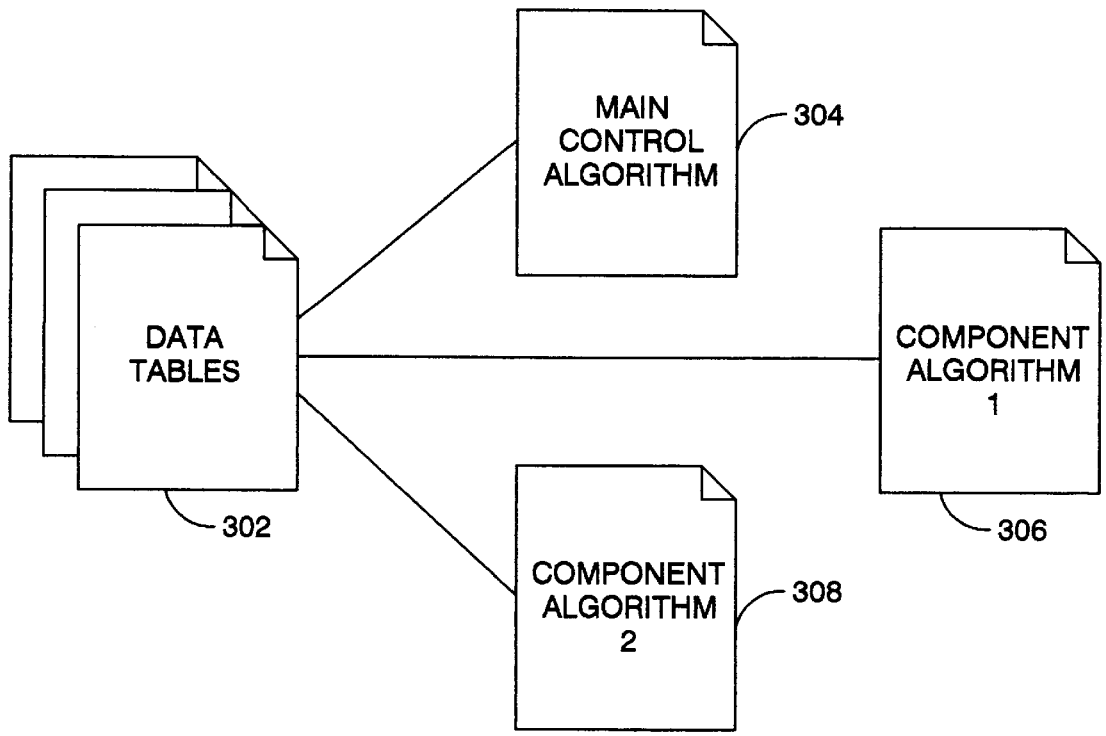
Fig_3_

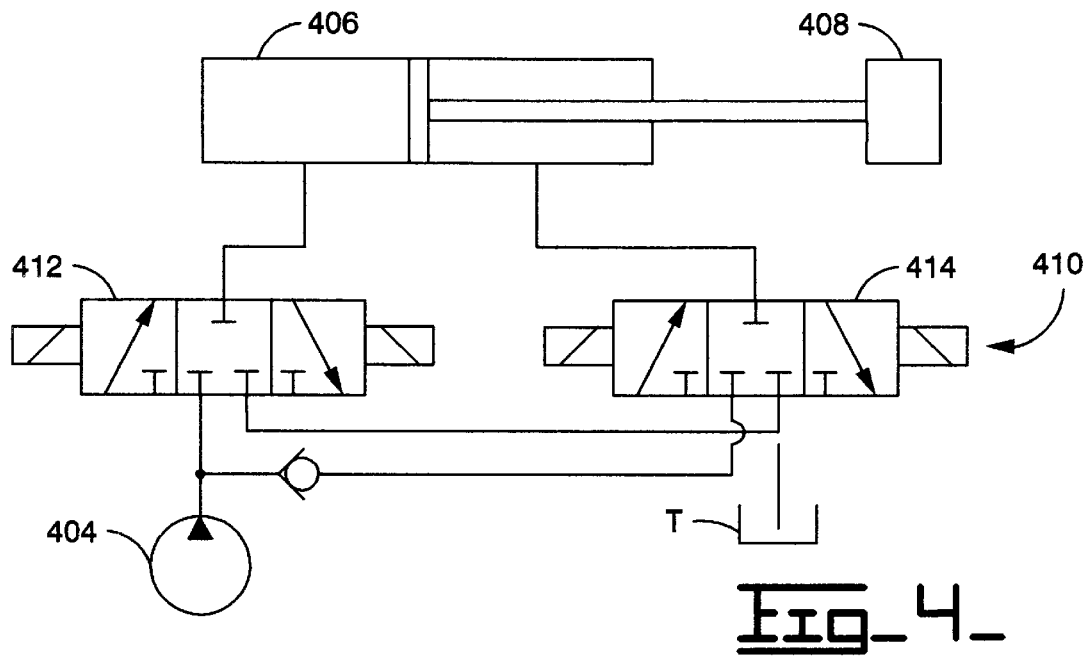
Fig_4_
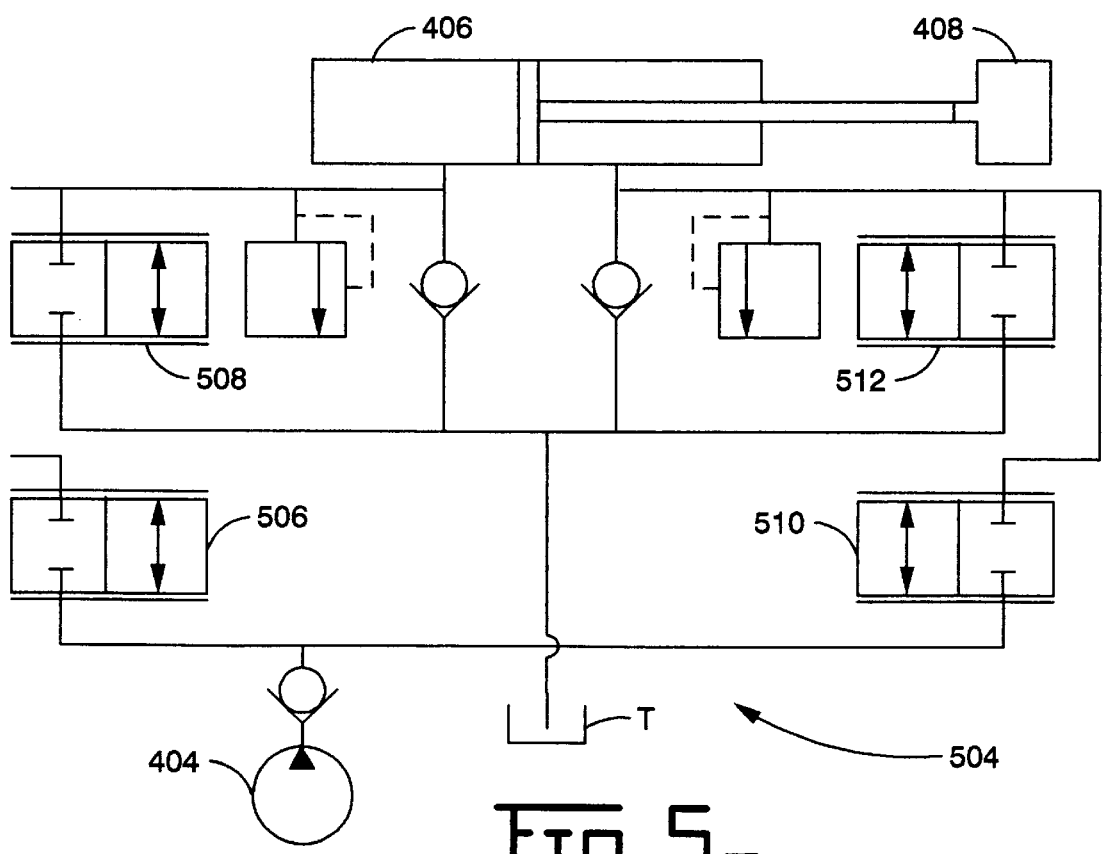
Fig_5_

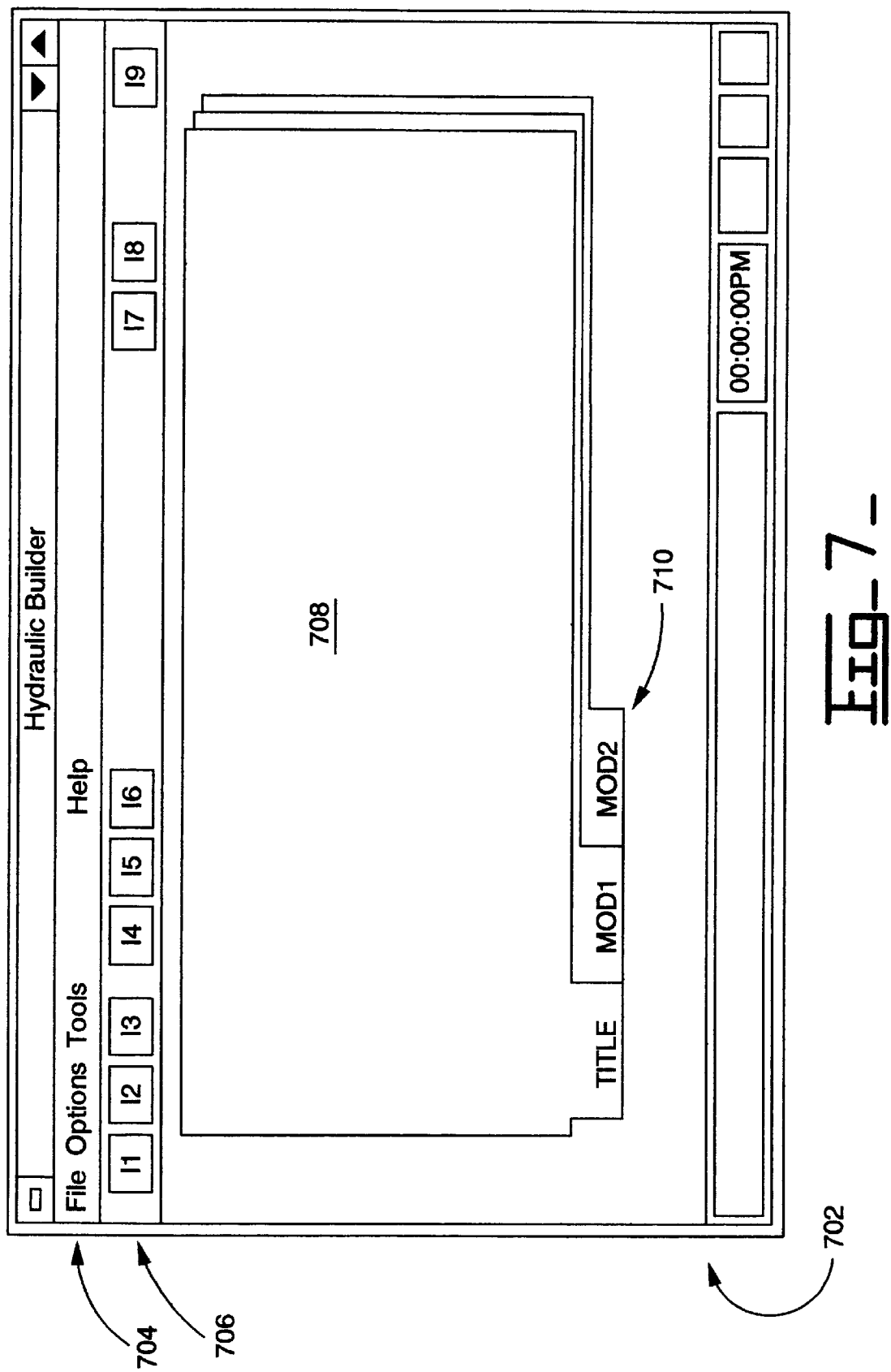

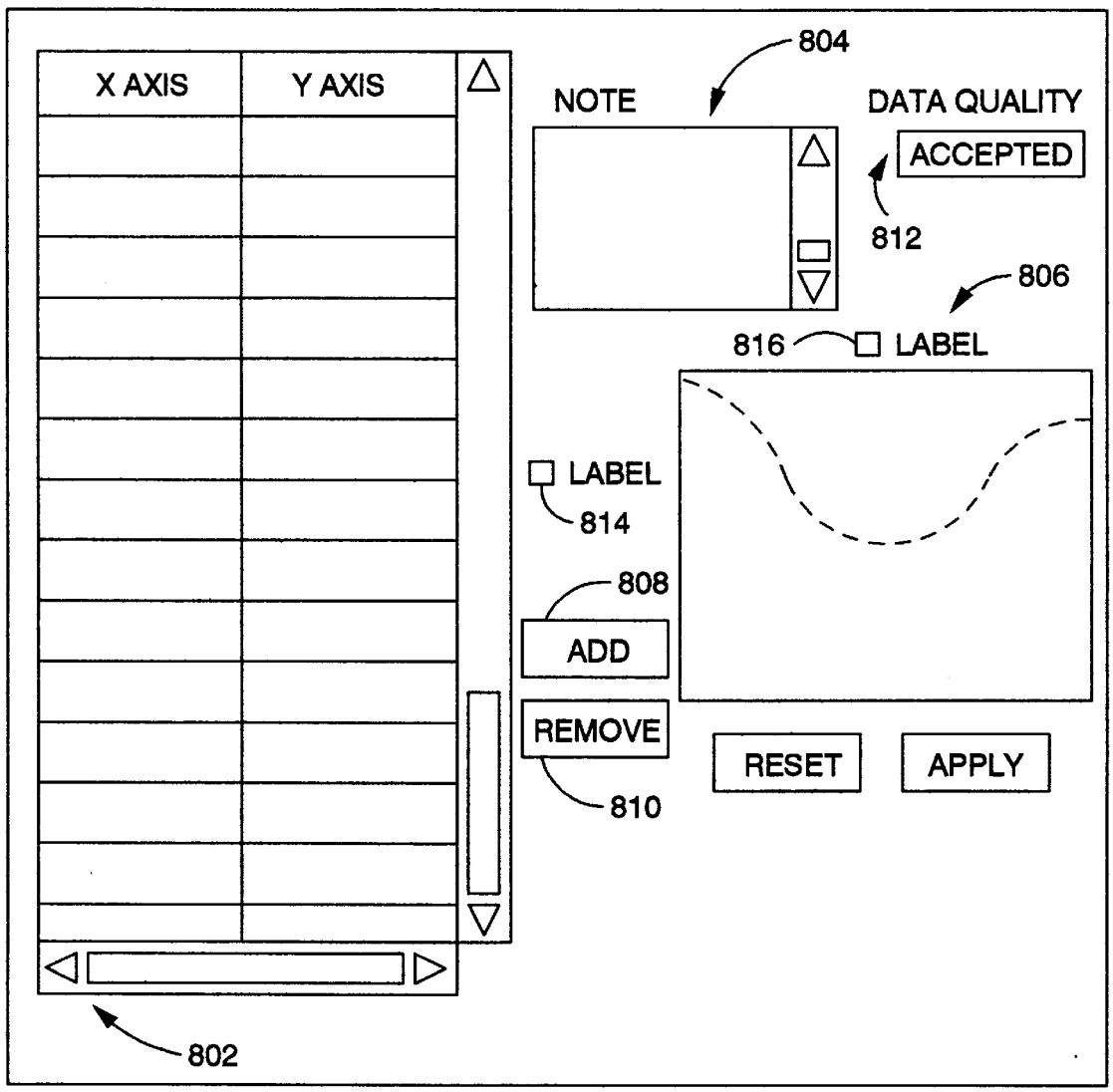
Fig_8_

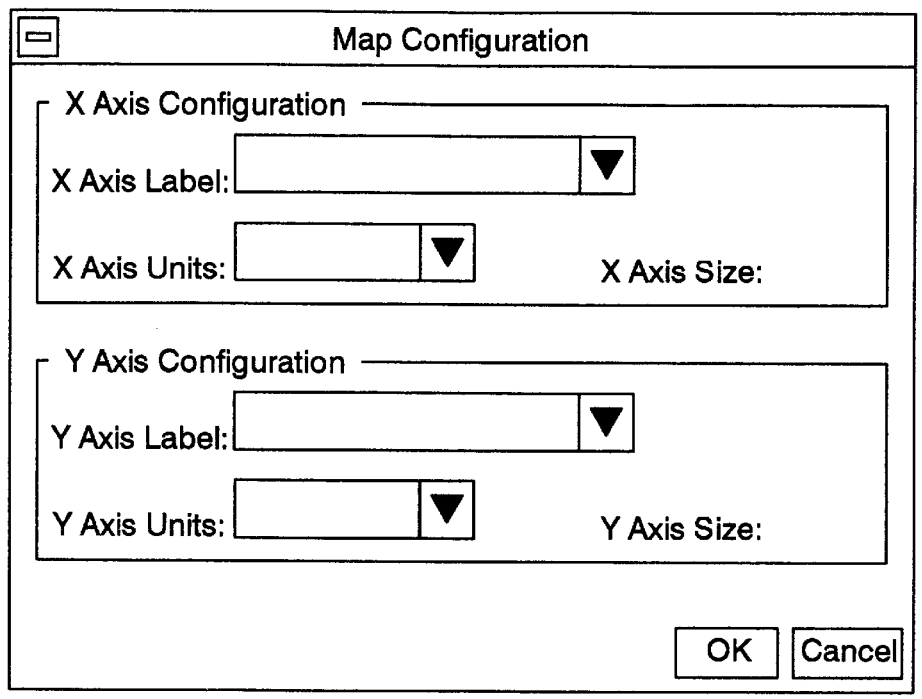
Fig_9_
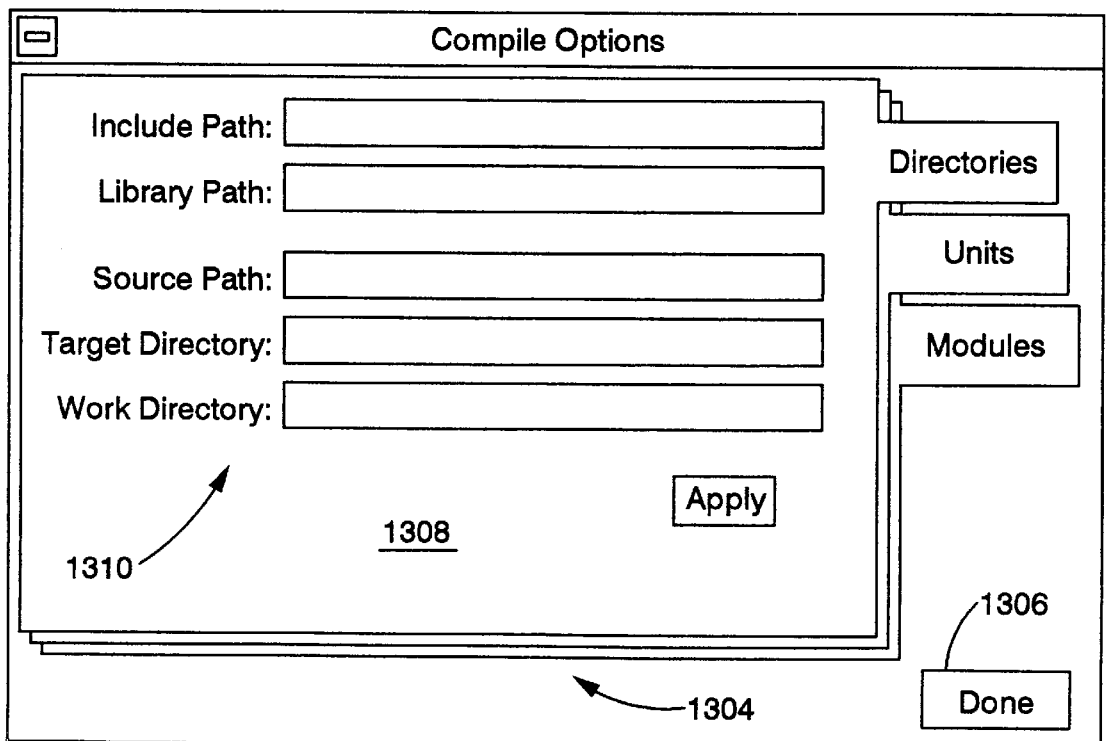
Fig_13_

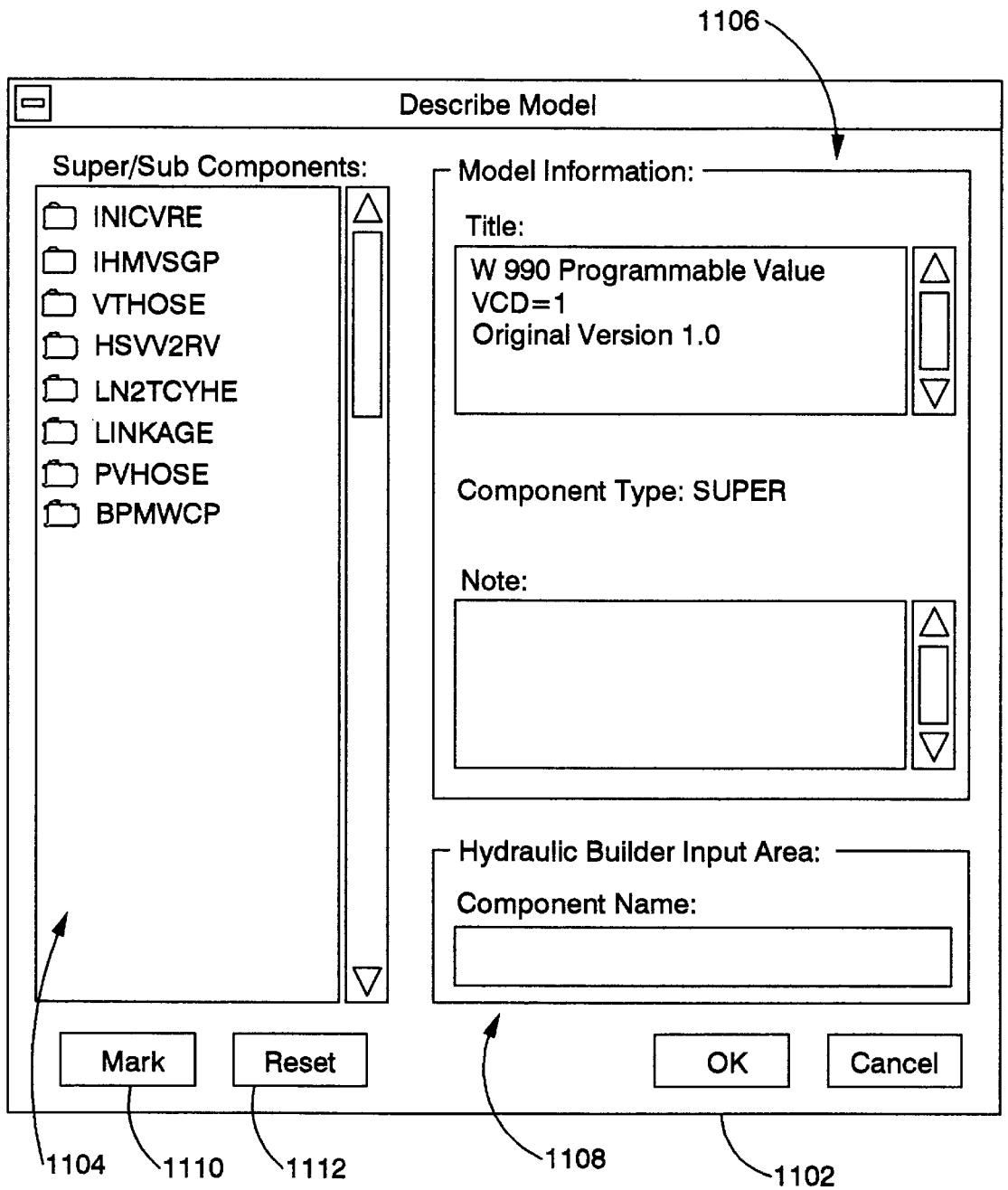
Fig_11_

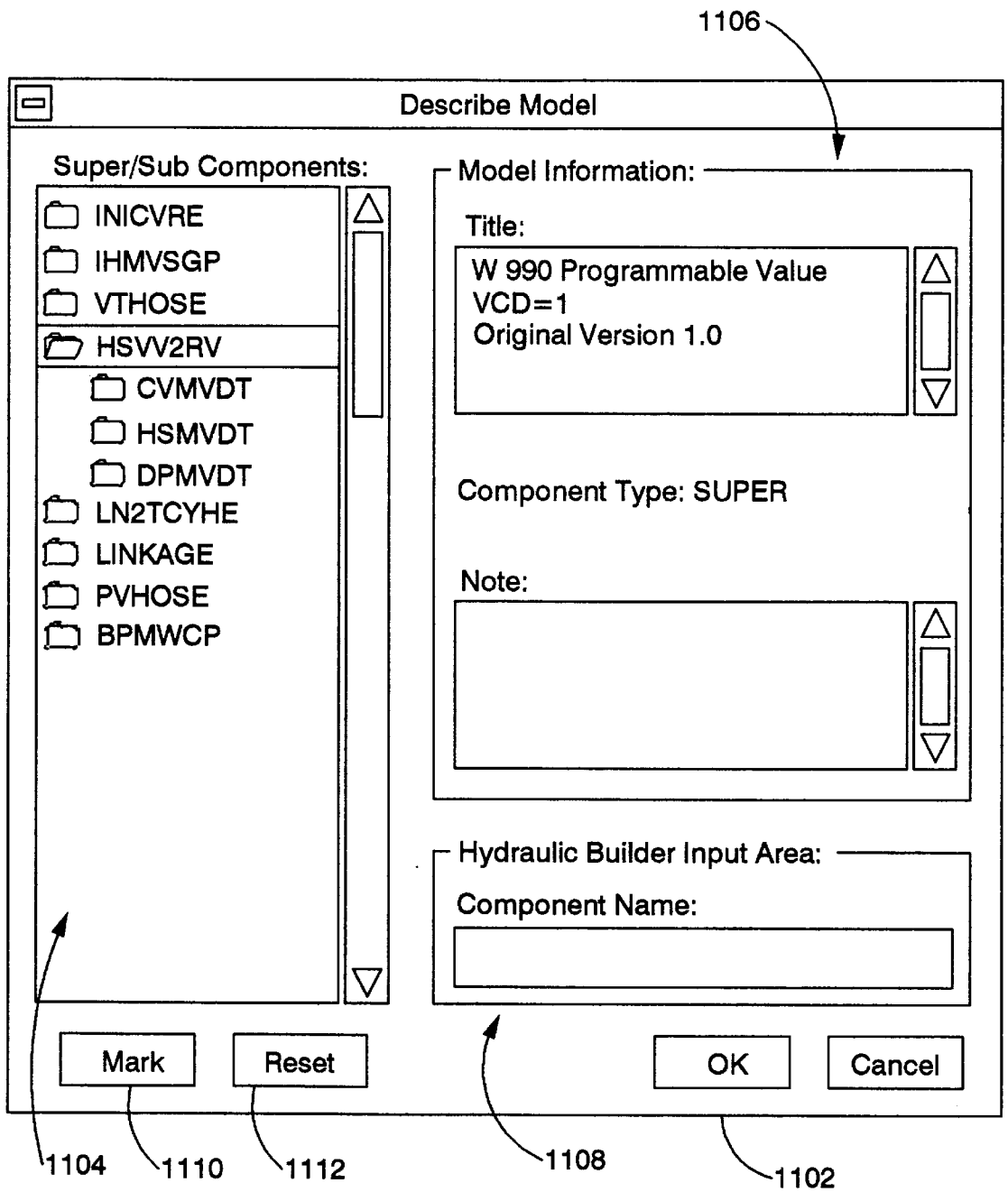
Fig_12_

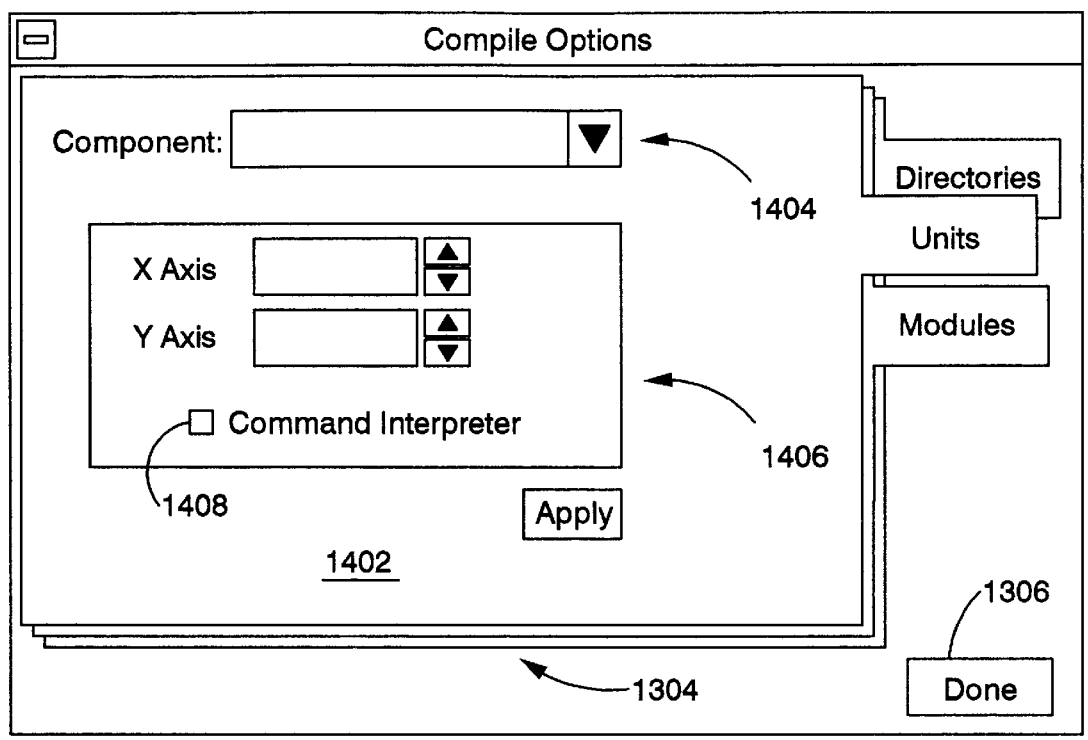
Fig_14_
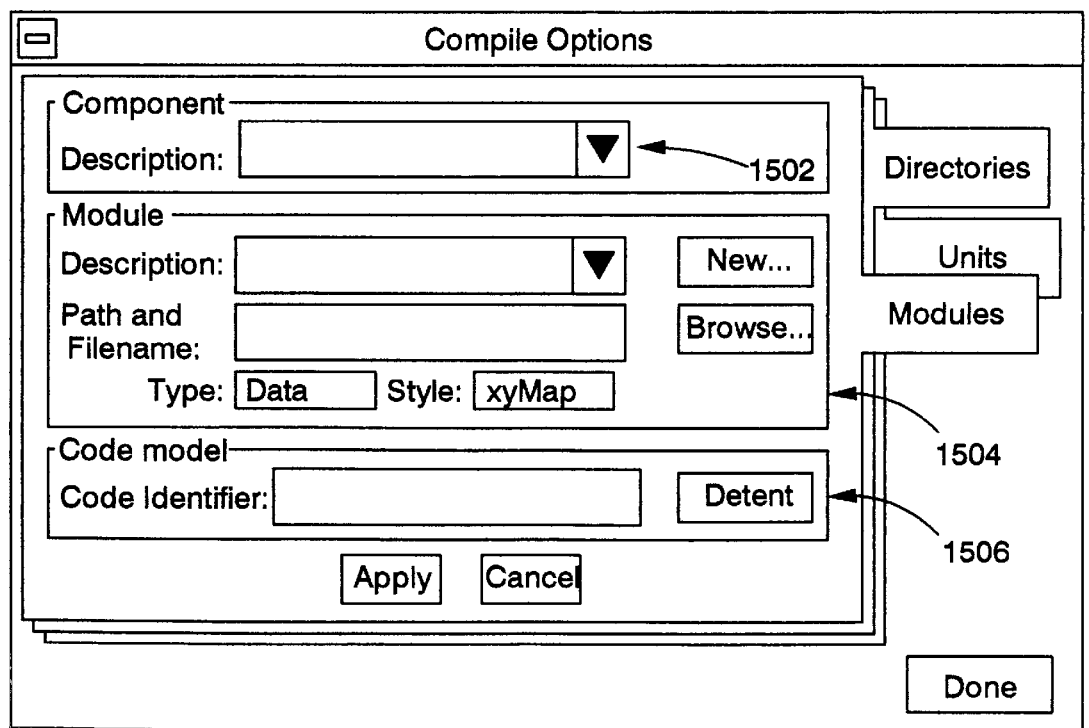
Fig_15_

5,880,957

METHOD FOR PROGRAMMING HYDRAULIC IMPLEMENT CONTROL SYSTEM

TECHNICAL FIELD

This invention related generally to hydraulic systems, and more particularly, to a method for programming a hydraulic implement control system based on user input.

BACKGROUND ART

Electronic controllers, typically microprocessor based, are being increasingly used. For example, electronic controllers are commonly used to control hydraulic systems on earthmoving machines. The electrohydraulic controller typically receives specific sensor information, e.g., electronic control handle position, and controls operation of the hydraulic system in accordance with a preprogrammed set of rules.

The evolving complexity and use of electronic controllers has demanded increasing design time. Each application is different, requiring a different set of sensors, different data, and different software. Even electronic controllers designed to control similar devices may require different sensors, data and software. Thus, an electrohydraulic controller, for example, must be designed and a unique set of rules must be written for each application.

Therefore, it became desirable to have a basic electronic controller system or platform for similar devices which is flexible. The electrohydraulic controller platform can be adapted/configured to work on various types, models, series or configurations of similar devices. However, each application has different requirements and specifications. Thus, utilization of the basic platform requires significant engineering design time and software engineer programming.

The present invention is directed to overcoming one or more of the problems set forth above.

DISCLOSURE OF THE INVENTION

In one aspect of the present invention, a method of operating a computer to produce control software for a hydraulic system is provided. The hydraulic system includes a pump, at least one valve, a motor and an electronic controller. The method includes the steps of defining a set of valve features of the electronic controller as a function of user input; and producing control software to operate the controller as specified by said set of valve features.

BRIEF DESCRIPTION OF THE DRAWINGS

FIG. 2 is a more detailed block diagram of the Hydraulic System Builder of FIG. 1;

FIG. 3 is a diagram of the input components of the Hydraulic Systems Builder of FIG. 1;

FIG. 4 is a diagrammatic illustration of a first target hydraulics system;

FIG. 5 is a diagrammatic illustration of a second target hydraulics system;

FIG. 7 is a diagrammatic view of a main screen of the Hydraulic Systems Builder;

FIG. 8 is a diagrammatic view of a map input and editing page of the Hydraulic Systems Builder;

FIG. 9 is a diagrammatic view of a Map Configuration Popup of the Hydraulic Systems Builder;

FIG. 11 is a diagrammatic view of a Describe Model Popup;

FIG. 12 is a second diagrammatic view of the Describe Model Popup;

FIG. 13 is a diagrammatic view of a Compile Options Popup;

FIG. 14 is a second diagrammatic view of the Compile Options Popup; and

FIG. 15 is a third diagrammatic view of the Compile Options Popup.

BEST MODE FOR CARRYING OUT THE INVENTION

Copyright

Portions of the disclosure of this patent document contain material which is subject to copyright protection. The copyright owner has no objection to the facsimile production by anyone of the patent document or the patent disclosure, as it appears in the Patent and Trademark Office patent file or records, but otherwise reserves all copyright rights whatsoever.

Introduction

Figure 1:
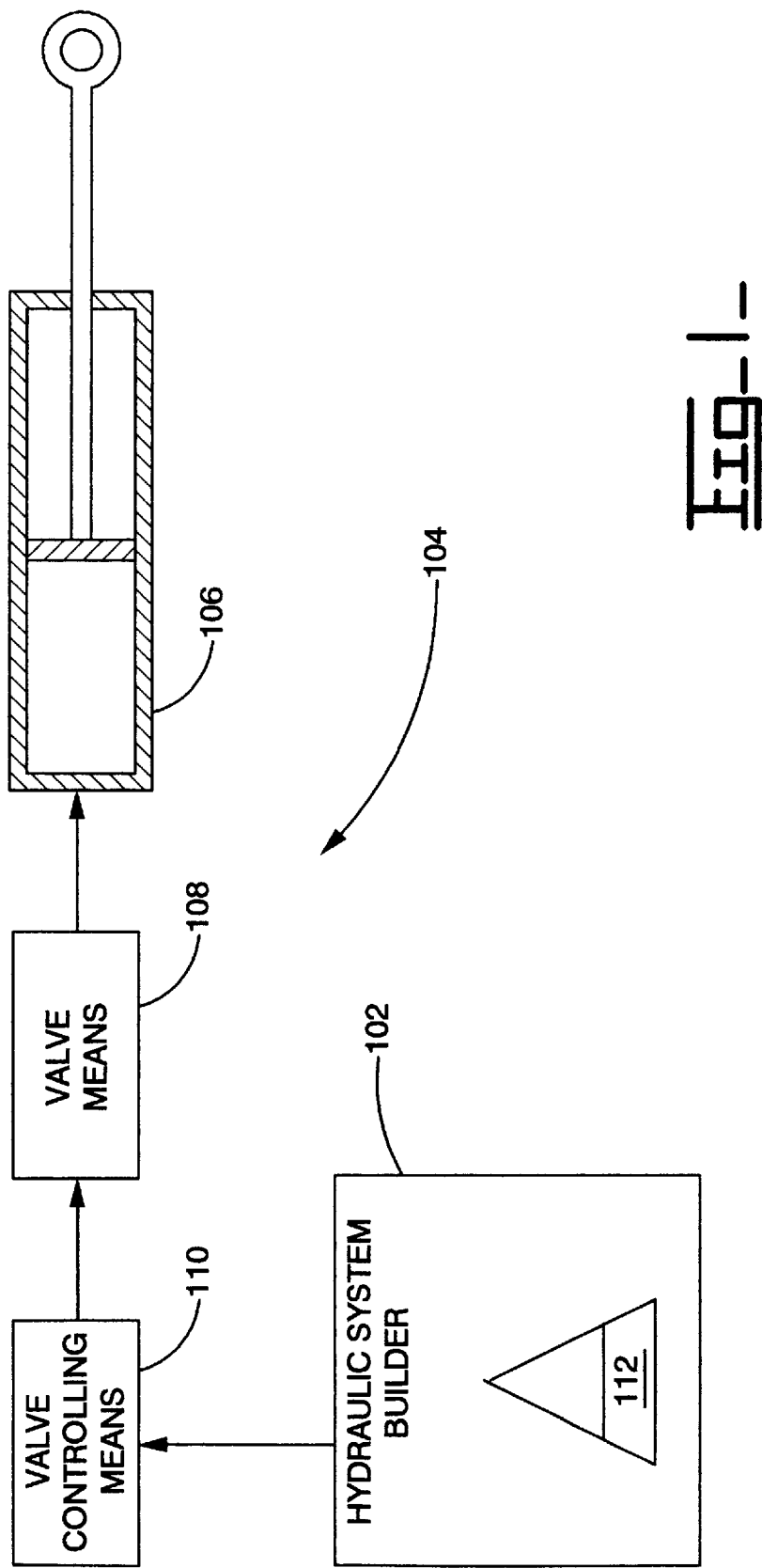
FIG. 1 is a block diagram of the present invention, illustrating a Hydraulic Systems Builder, a controller and a controlled device.

Referring to FIG. 1, the present invention or Hydraulic Systems Builder (HSB) 102 provides a method of operating a computer to automatically produce control software for a hydraulic system 104. The hydraulic system 104 includes a hydraulic motor, e.g., a hydraulic cylinder 106, a valve means 108 and a valve controlling means 110. The valve controlling means 110 is programmable, and preferably, microprocessor based. The valve controlling means 110 is adapted to operate the valve means 108 in accordance with pre-programmed set of instructions or computer program. The valve means 108 may include a valve or series of valves as discussed below.

The HSB 102 generally allows for user input of the specifications of the target hydraulic system and produces the control software for the target valve controlling means. In the preferred embodiment, the HSB 102 utilizes a database of software code and the user defined system parameter information and configuration data.

With reference to FIG. 2, in block 202 the parameter information and configuration data is input by a user of the HSB 102. The HSB 102 combines the user input information with one or more core software routines 204. In block 206, the combined user input information and core modules are compiled into an file 208. The file 208 is capable of being executed in a computer modeling program, a hydraulic system test bed, or hydraulic system in the field. A report 210 may also be generated detailing the operation.

With reference to FIG. 3, the parameter information preferably includes a number of data tables 302 (described below). The core software modules include a main control algorithm 304 and/or one or more component algorithm modules 306,308, as required by the configuration data.

In one embodiment, the parameter information and configuration data is converted into a machine format and placed in a file. The file may then be downloaded to the target controller for testing. A database includes sets of default parameters and configurations which are dependent upon choices made by the user.

In a second embodiment, the HSB 102 converts the user input specifications into machine code which can be run directly by the target controller.

The present invention is embodied in a computer 112. The computer is programmed to receive user input and to produce the control software. The user inputs the parameters of the target valve controller as discussed below. The computer 112 may be a microcomputer, a mainframe, a general purpose computer, or any other suitable computer system. In the preferred embodiment, the present invention is embodied in a programmed HP (Hewlett Packard) workstation running the HP UX operating system. The HSB 102 can be accessed via any workstation connected or networked to the programmed workstation.

The present invention is designed to be used in the development of production control software for a controller. The controller may be a new design or a new configuration built on a common platform. The present invention provides a method whereby a user, knowing the specifications of the target controller, inputs the specifications of the target controller and the control software is produced. The user does not have to be a computer programmer or have any computer programming experience.

Hydraulic System Architecture and Control Architecture

With reference to FIGS. 4 and 5, the HSB 102 is presently adapted to produce control software to control first and second general hydraulic system architecture architectures as illustrated. Preferably, the system architectures include a plurality of programmable valves, spool or poppet.

In the first general hydraulic architecture, a pump 404 supplies hydraulic power to a hydraulic motor 406, shown as a hydraulic cylinder. The hydraulic cylinder 406 acts on a load 408. In the first general hydraulic architecture, the valve means 108 is a split valve configuration 410 and includes first and second split spool valves 412,414. The first split spool valve 412 is connected between one end of the hydraulic motor 406 and the pump 404 and tank (T). The second split spool valve 414 is connected between the other end of the hydraulic motor 406 and the pump 404 and tank (T). Each split spool valve 412,414 is an electrohydraulically controlled valve under control of the valve control means 110. Each valve has three positions. The first split spool valve 412 controls hydraulic fluid flow from the pump 404 to the head end of the hydraulic cylinder 406 and hydraulic fluid flow from the head end of the hydraulic cylinder 406 to tank, T. The second split spool valve 414 controls hydraulic fluid flow from the pump 404 to the rod end of the hydraulic cylinder 406 and from the rod end of the hydraulic cylinder 406 to the tank.

In the second general hydraulic architecture, elements in common with the first general hydraulic architecture are numbered similarly. A pump 404 supplies hydraulic power to a hydraulic motor 406, shown as a hydraulic cylinder. The hydraulic cylinder 406 acts on a load 408. In the second general hydraulic architecture, the valve means 108 is a four valve independent metering system 504 and includes first, second, third, and fourth independent metering valves 506, 508, 510, 512. The first independent metering valve 506 controls hydraulic fluid flow from the pump 404 to the head end of the hydraulic cylinder 406. The second independent metering valve 508 controls hydraulic fluid flow from the head end of the hydraulic cylinder 406 to the tank, T. The third independent metering valve 510 controls hydraulic fluid flow from the pump 404 to the rod end of the hydraulic cylinder 406. The fourth independent metering valve 512 controls hydraulic fluid flow from the rod end of the hydraulic cylinder 406 to the tank, T.

Figure 6:
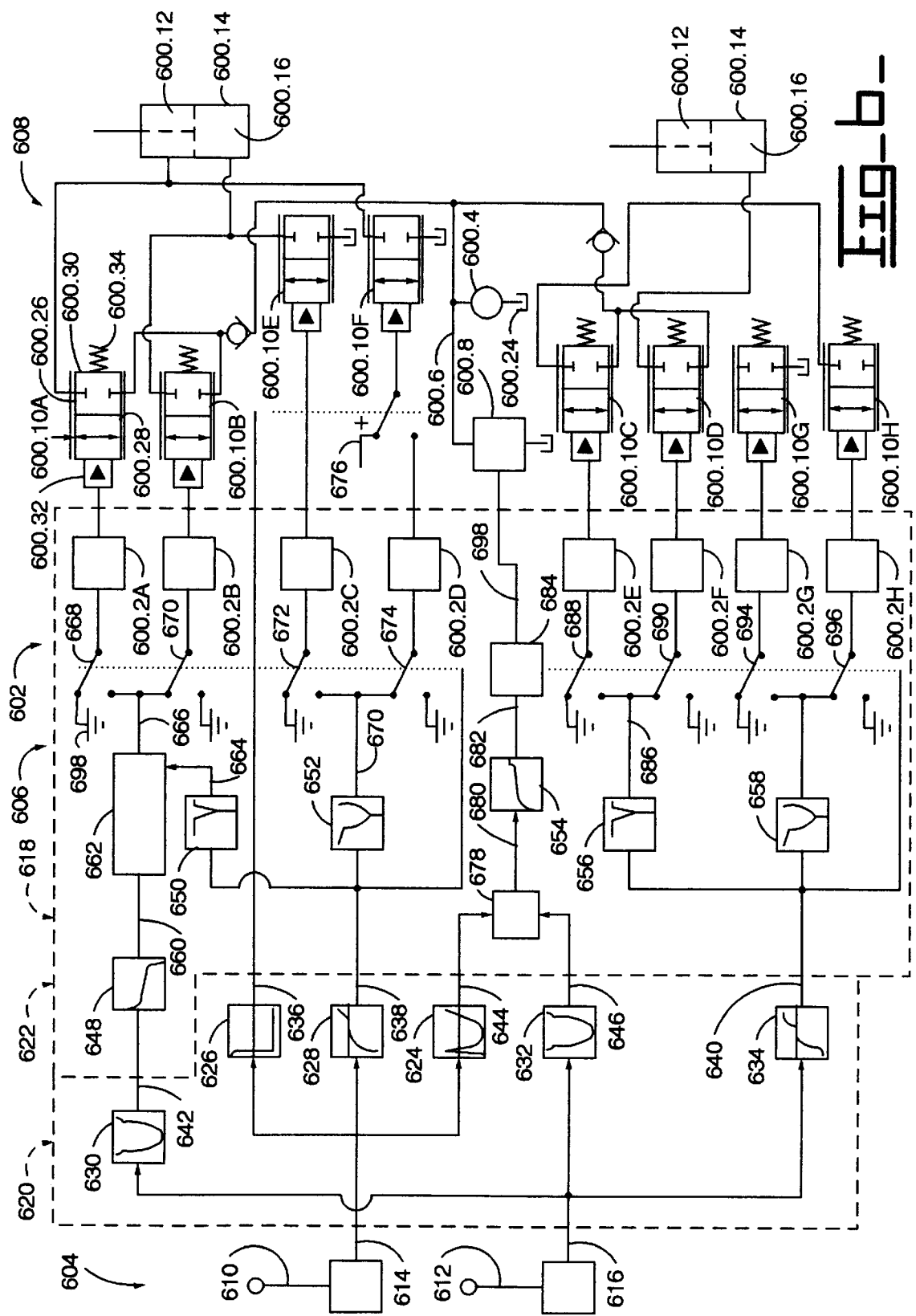
FIG. 6 is a diagrammatic illustration of a third target hydraulics system.
Figure 10:
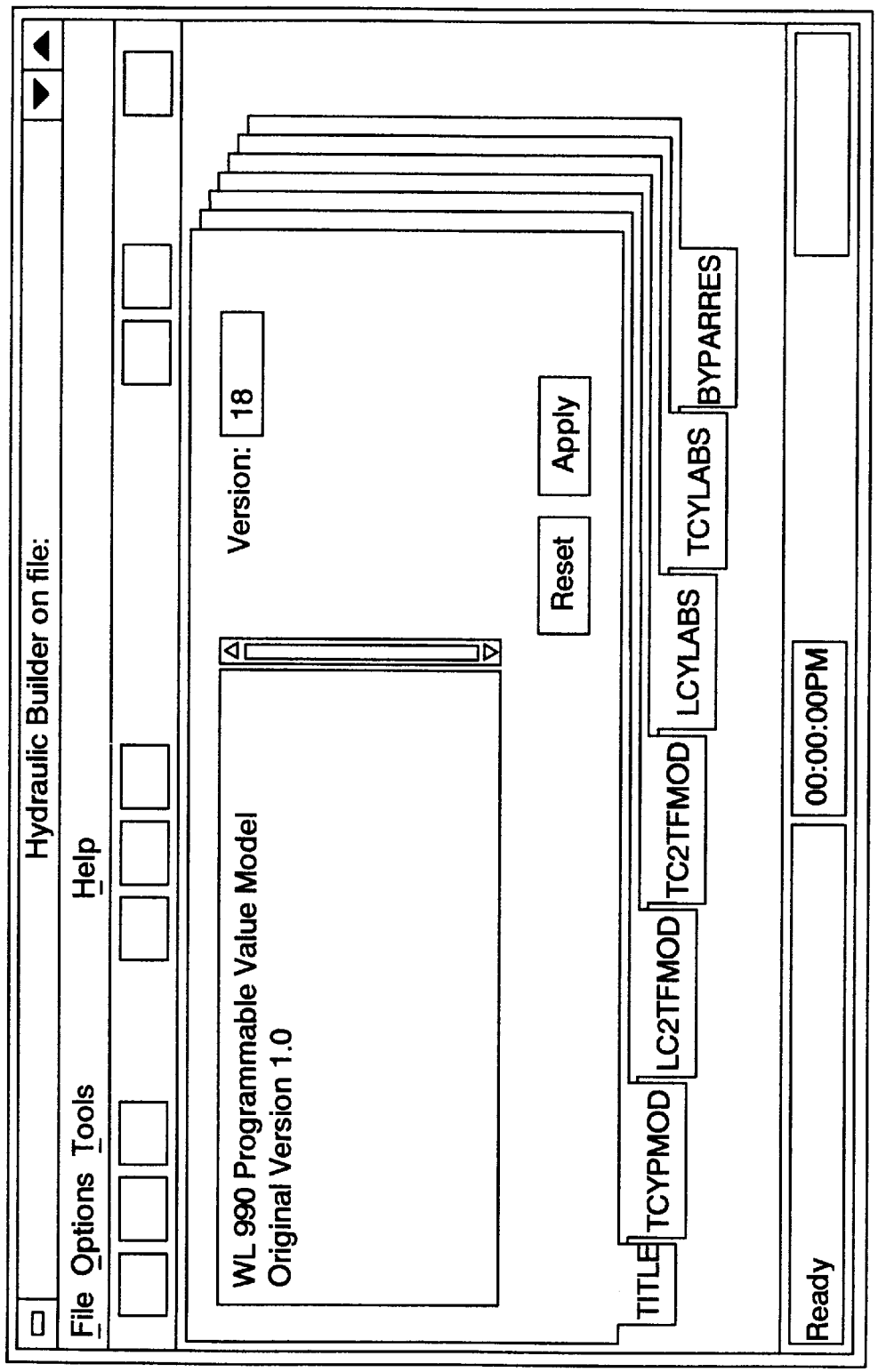
FIG. 10 is a diagrammatic view of the Main Screen of the Hydraulic Systems Builder illustrating a title page.

With reference to FIG. 6, the present invention may be adapted to produce control software for a hydraulic system 602 having more than one hydraulic cylinder.

The control system 602 is shown for controlling the implements of a machine, for example the bucket of a wheel loader, (not shown). The control system 602 includes an operator input control section 604, an electronic control section 606 and a hydraulic control section 608.

The operator input control section 604 includes a first implement lever 610 for raising and lowering the implement of the machine and a second implement lever 612 for controlling the rackback and dump of the implement. The movement of the first implement lever 610 produces an electrical control signal 614 which is sent to the electronic control section 606. The movement of the second implement lever 612 produces an electrical control signal 616 which is also sent to the electronic control section 606. The control signals 614, 616 are positive when the implement levers 610, 612 are moved to raise and rackback the implement. The control signals 614, 616 are negative when the implement levers 610,612 are moved to lower or dump the implement.

The electronic control section 606 can be in the form of a microprocessor 618 or any other suitable system for controlling the hydraulic control section 608. The electronic control section 606 includes a requirement stage 620 and an implementation stage 622.

The control signal 614 from the first lever 610 is sent to a pressure map 624, a float logic map 626 and a modulation map 628 within the requirement stage 620. The control signal 616 from the second control lever 612 is sent to a pressure map 630, a pressure map 632 and a modulation map 634 within the requirement stage 620. The maps 624–634 convert the operator input signals 614, 616 into two separate requirements, such as one requirement being a plurality of desired implement velocity signals 636, 638 and 640. The second requirement being a plurality of desired pressure signals 642, 644 and 646. The maps 624–634 are in the form of lookup tables which receive the operator input signals 614, 616 and converts them into the desired implement velocity or pump pressure and sends the signals to the implementation stage 622.

The implementation stage 622 determines what needs to be actuated in order to meet the desired requirements. The implementation stage 622 includes a plurality of pressure and flow modulation maps 648–658. Pressure map 648 receives the input signal 642 and determines what command is necessary and sends a signal 660 to a limiter module 662. Flow modulation maps 650, 652 receive the input signal 638. Map 650 sends a signal 664 to the limiter module 662. The limiter module 662 combines the signals 66, 664 and sends a signal 666 to a switch 668 and a switch 75. Map 652 sends a signal 670 to a switch 672 and a switch 674. Signal 638 is also used to control the position of the switches 668, 75, 672 and 674. Signal 636 is used to control the position of a float control switch 676. Pressure signals 644, 646 are sent to a selector module 678 which selects the larger of the two signals 644, 646 and sends a selected signal 680 to the map 654. Map 654 sends a signal 682 to an actuator 684. Flow modulation maps 63, 658 receive the input signal 640. Map 656 sends a signal 686 to a switch 688 and a switch 690. Map 658 sends a signal to a switch 694 and a switch 696. Signal 640 is also used to control the position of the switches 688, 690, 694 and 696. The switches are constructed so that when a positive signal is received switches 670, 674, 690 and 696 are connected to the respective signal and the other switches 668, 672, 688 and 694 are connected to a ground 698. When a negative signal is received the switch connections are reversed. Switches 668, 75, 672, 674, 688, 690, 694, and 696 are connectable to a respective actuator 600.2a, 600.2b, 600.2c, 600.2d, 600.2e, 600.2f, 600.2g and 600.2h.

The hydraulic control section 608 includes a supply pump 600.4. A line 600.6 connects the supply pump 600.4 to a bypass valve 600.8. A signal 698 from the actuator 684 is connected to the bypass valve 600.8 for controlling the pressure within the hydraulic control section. The line 600.6 also connects the supply pump 600.4 to a plurality of independently operable solenoid displacement controlled flow metering spool valves 600.10a,600.10b, 600.10c and 600.10d. The valve 600.10a is connected to a rod end chamber 600.12 of a hydraulic actuator 600.14 and the valve 600.10b is connected to a head end chamber 600.16 of the hydraulic actuator 600.14. The valve 600.10c is connected to a rod end chamber 600.18 of a hydraulic actuator 600.20 and the valve 600.10d is connected to a head end chamber 600.22 of the hydraulic actuator 600.20. Another plurality of independently operable solenoid displacement controlled flow metering spool valves 600.10e,600.10f,600.10g and 600.10h are disposed between the hydraulic actuators 600.14, 600.20 and a tank 600.24. The valve 600.10e is connected to the head end chamber 600.16 and the valve 600.10f is connected to the rod end chamber 600.12 of the hydraulic actuator 600.14. The valve 600.10g is connected to the head end chamber 600.22 and the valve 600.10h is connected to the rod end chamber 600.18 of the hydraulic actuator 600.20. The spool valves 600.10a,600.10b,600.10c, 600.10d control pump-to-cylinder fluid flow to the actuating chambers and the spool valves 600.10e, 600.10f, 600.10g, 600.10h control cylinder-to-tank fluid flow from the actuating chambers to the tank. Each of the spool valves 600.10a, 600.10b,600.10c,600.10d,600.10e,600.10g,600.10h are connected to the respective actuator 600.2a,600.2b,600.2e, 600.2f,600.2c,600.2g,600.2h. The spool valve 600.10f is connectable to the actuator 600.2d by the float switch 676. The valves 600.10a,600.10b,600.10e,600.10f are controlled to extend the hydraulic actuator 600.14 for raising the implement and to retract the actuator 600.14 for lowering the implement. The valves 600.10c,600.10d, 600.10g,600.10h are controlled to extend the hydraulic actuator 600.20 for rackback of the implement and to retract the actuator 600.20 for dumping the implement.

Each of the spool valves 600.10a, 600.10b, 600.10c, 600.10d, 600.10e, 600.10f, 600.10g, 600.10h are substantially identical with only spool valve 600.10a being described in detail with common reference numerals applied to the elements of all of the spool valves followed by the appropriate letter. Each of the spool valves includes a solenoid actuated valve spool 600.26 having opposite ends 600.28,600.30. A solenoid 600.32 disposed on the end 600.28 is connected to the respective actuator such as 600.2a. A spring 600.34 is disposed at the end 600.30 opposite the solenoid 600.32. In an alternate embodiment, the spool valves are replaced with HYDRAC actuated valves.

The spring 600.34 normally biases the valve spool 600.26 to a neutral or non-energized position. The spool valves are shown as being in their neutral positions occupied when the control levers are in the centered position.

System Features and Data Map Input

With reference to FIG. 7, the main screen 702 of the HSB 102 is illustrated. The main screen 702 provides menus and icons for navigation through its functions and options. Advantageously, the main screen 702 includes a pull down menu bar 704 with a plurality of pull down menus. In the preferred embodiment, the pull down menus includes "File", "Options", "Tools", and "Help". Each menu has a number of selections. The selections for each menu have the following functions:

File

Open: Select and open an existing algorithm file;

Import: Import components from a model file;

Save: Save the current algorithm file;

Save as: Save the current algorithm to another file name or location;

Export: Export the current algorithm to a model file; and

Exit: Close HSAB.

Options

Styles: Configuration information to define the module type;

Help Contents File: Configuration for the Help contents;

Applications: Configuration for applications run from HSB;

Template: Configuration information to maintain code and report templates;

Notepad: Configuration of the message notepad editor;

Preferences: Miscellaneous configuration information;

Search: Configuration of search template files;

Module: Configuration of the module types supported by HSB;

Maps: Used to specify the valid units and labels for charts;

Help Index; Help Index File; and

Compiler: Configuration information for compiling.

TOOLS

Describe Model: Display the components and subcomponents of an imported module;

Describe Code Model: Configure the import model to an internal model;

Graph: Enlarge the currently displayed graph;

Compile: Compile the current algorithm; and

Download: Execute the user-defined download batch file.

Help

Contents: Available topics;

Index: Alphabetic lists of topics;

Using: Standard instructions for using the Help utility; and

About HSB: Program data.

The main screen 702 further includes a button bar 706. Advantageously, the button bar 706 includes nine icons, I1, I2, I3, I4, I5, I6, I7, I8, I9, which when activated perform specific functions. In the preferred embodiment, activation of each icon performs the following functions.

I1: opens an algorithm;

I2: saves the current algorithm;

I3: exit the program;

I4: configure the imported model to an internal model;

I5: configure the current model to code;

I6: enlarge the currently displayed graph;

I7: compile

I8: download to an electronic control module (ECM); and

I9: access the Help menus.

An algorithm is composed of modules. Each module has associated data or parameters with. When the algorithm is compiled, the modules are integrated with program code to create executable code.

After an algorithm is completed, it may be saved, saved in a specific model, compiled into an executable file and stored, and/or compiled into an executable and downloaded into an electronic control module for testing.

Throughout the HSB 102 certain conventions are used. All data input and menu windows contain three standard control buttons: "OK", "Cancel", and "Help". An additional "Options" control button appears on select menu windows. The standard control buttons have the following functions:

OK: The OK button is used to accept the data currently displayed within the window.

Cancel: The Cancel button will discard any changes made in the current window and any sub-window.

Options: The Options button will display a popup window with additional functions that can be performed, e.g., "Print", "Plot", "Download", "Add/Edit Note", "Import", and "Save". Specific options are not available for all features. The Add/Edit Note option allows a text note to be attached to the current map or module. The Import features allows data to be read from files which have been saved in different file formats.

Help: The Help button will display information relating to the current window.

Data is entered using various methods in the data input windows. A pushbutton or button is activated by positioning a pointer (via a mouse) on the button and clicking (pressing and releasing) a first mouse button (MB1). The user must supply the requested information in a text field followed by a TAB or RETURN. If the entered information is not valid, an error message will be displayed. To select an option within an option menu, the user placed the pointer on the option menu and presses (and holds) MB1. A list of menu items will be displayed. To select the desired option, the user moves the pointer to the desired option and releases MB1.

To select a value via a slider, the user positions the pointer on a slider bar and presses MB1. While holding MB1, the slider bar can be moved until the desired value is displayed.

A toggle button indicates a True/False or On/Off value. To change the state of a toggle button, the user position the pointer on the button and clicks MB1.

A radio box is a collection of toggle buttons, where only one of the toggle buttons can be active or on at one time.

Selection boxes display a list of options and a selection edit field. An option from the list may be selected by clicking MB1 with the pointer on the item in the list or the selection may be entered manually in the selection edit field. After an item is selected, a row of control pushbuttons is used to accept or cancel the selection.

Popups or windows appear in certain situations, asking for specific data or confirming a specific action.

When an error condition is encountered, an Error Popup with an appropriate error message will be displayed. Clicking MB1 with the pointer positioned on the OK or Cancel pushbutton will remove the Error Popup and allow the re-entry of data that caused the error.

When the input of a FILENAME is required, a File Selection Popup appears. A Filter Field contains a wildcard specification. A Directories field and a Files Field display the available directories and the files which meet the requirements of the Filter Field, respectively. To select a file, the pointer is positioned on a filename in the Files Field and MB1 is clicked. The selected file will be highlighted and displayed in a Selection Edit Field. Optionally, a filename may be entered manually in the selection edit field.

A File Print Popup displays the printers available and allows for the selection of various print options.

Some selection boxes are displayed as separate popups. After the desired selection is made, the popup is removed. Additionally, data entry, for example, entry into a test field, may be done via a popup.

Returning to FIG. 7, as represented on the main screen 702, an algorithm is composed of a number of pages. A series of tabs 710 are used to select each page in the algorithm. Preferably, each module is represented by a page. Shown in the example main screen is an algorithm with a Title Page and two module pages (MOD1, MOD2).

With reference to FIG. 8, a sample page representing a module is shown. The module include a mapping section 802, a note section 804 and a graph section 806. Preferably the mapping section 802 includes two columns, an x-axis column and a y-axis column. The x-axis values represent the range of the map and the y-axis values represent the domain of the map. The range and domain can be edited by selecting the corresponding cell and over-typing the current value. To add an X,Y pair, the insertion point is selected and an ADD button 808 is pressed. To remove an X,Y pair, a REMOVE button 810 is pressed.

An optional text note may be added in the note section 804.

A data quality selection box 812 allows the user to indicate the quality of the data entered into the map. Preferably, four data qualities are offered: "experimental", "poor", "good", and "accepted".

First and second Data Label Buttons 814, 816 are provided. With reference to FIG. 9 pressing either button 814, 816 causes a Map Configuration popup window to be displayed. The Map Configuration popup allows the user to designate x-axis and y-axis labels and associated units.

With reference to FIG. 11, when the icon I4 is pressed or the Describe Model selection under the TOOLS menu is selected, a Describe Model Popup 1102 is displayed.

The Describe Model Popup 1102 includes a Super/Sub Component List Section 1104, a Model Information Section 1106 and a Hydraulic Builder Input Area 1108. The List Section 1104 includes a list of components, a Mark Button 1110 and a Reset Button 1112.

As shown in FIG. 12, clicking on a super component displays a list of sub components. To mark a super component for configuration, the user selects (highlights) the component and activates the Mark Button 1110. A component is configured through the main screen 702 as described above.

The Model Information Section 1106 and the Hydraulic Builder Input Area 1108 display information about the current model and component.

With reference to FIG. 13, when the icon "I5" is pressed or the Compile option under the Tools menu is selected, a Compile Options Popup 1302 is displayed. The Compile Options Popup 1302 includes a series of compile pages 1304. In the preferred embodiment, there are three compiles pages: a Directory Page, a Units Page, and a Modules Pages. A page is selected by clicking on a corresponding tab. Selection of a Done Button 1306 starts the compiling process.

The Directory Page 1308 is illustrated in FIG. 13. The Directory Page 1308 offers a series of boxes 1310 for selection of directories associated with the current algorithm.

With reference to FIG. 14, the Units Page 1402 includes a Component Drop-Down List 1404 of the components composing the current algorithm. A Scale Box 1406 allows the user to input a scaling factor for each axis. Also an Integer Button 1408 automatically converts the map to integers.

With reference to FIG. 15, the Modules Page 1502 includes a Component Drop-Down List 1504 of the components composing the current algorithm. A Module Descriptor Box 1504 describes the current module, i.e., a Description, Path and Filename, Type, and Style. A Code Model Identifier Box 1506 is used to identify the model code of the current component.

Industrial Applicability

With reference to the drawings, and in operation, the Hydraulic Systems Builder (HSB) 102 is adapted to produce the software for a target valve controlling means 110. The target controlling means 110 is adapted to control a valve means 108.

A user of the HSB 102 need not have any programming experience. The user simply inputs the specifications and parameters of the target valve controlling means 110, valve means, and hydraulic system using the screens and menus of the HSB 102. After this process is completed, the HSB 102 assembles the machine code for the particular microprocessor(s) on the target controller 104. Alternatively, the HSB may compile a file which is executable by simulation software.

The HSB 102 is useful in many different situations. The HSB 102 may be used in the design of a new application based on the common platform. The HSB 102 may also be used to develop and distribute updates to the code for controllers already in use. Additionally, HSB 102 may be used during the manufacture of new machines. Not only does each machine model have different requirements, but each individual machine may have different requirements based on machine options, ultimate work site of the machine and/or customer preference. The HSB allows the software to be run on the target controller 110 to be produced by a user who is not skilled in the art of computer programming.

Other aspects, objects, advantages and uses of the present invention can be obtained from a study of the drawings, disclosure and appended claims.

We claim:

1. A method of operating a computer to produce control software for a hydraulic system, the hydraulic system including a pump, at least one valve, a motor and an electronic controller, including the steps of:

defining a set of valve features of the electronic controller as a function of user input, wherein said valve features include at least one map; and producing control software to operate the controller as specified by said set of valve features.

2. A method, as set forth in claim 1, wherein said valve features include a pressure map and a flow modulation map.

3. A method, as set forth in claim 1, wherein the control software producing step includes the step of combining the set of valve features with predefined software code and configuration data.

4. A method, as set forth in claim 1, including the step of executing the control software via a computer modeling program.

5. A method, as set forth in claim 1, including the step of controlling a hydraulic system test bed with the control software.

6. A hydraulic system builder, implemented on a computer for producing control software for a hydraulic system, the hydraulic system including a pump, at least one valve, a motor and an electronic controller, including:

user input screens for defining a set of valve features of the electronic controller as a function of user input, wherein said valve features include at least one map; and means for receiving the set of valve features and producing control software to operate the controller as specified by said set of valve features.

7. A method, as set forth in claim 6, wherein said valve features include a pressure map and a flow modulation map.

8. A method, as set forth in claim 6, wherein the control software producing means includes means for combining the set of valve features with predefined software code and configuration data.

* * * * *